Dec. 6, 1955

J. BELL 2,726,382

ANGULAR ADJUSTMENT OF SYNCHROS

Filed Feb. 11, 1952

Inventor
John Bell

Dec. 6, 1955  J. BELL  2,726,382
ANGULAR ADJUSTMENT OF SYNCHROS
Filed Feb. 11, 1952  2 Sheets-Sheet 2
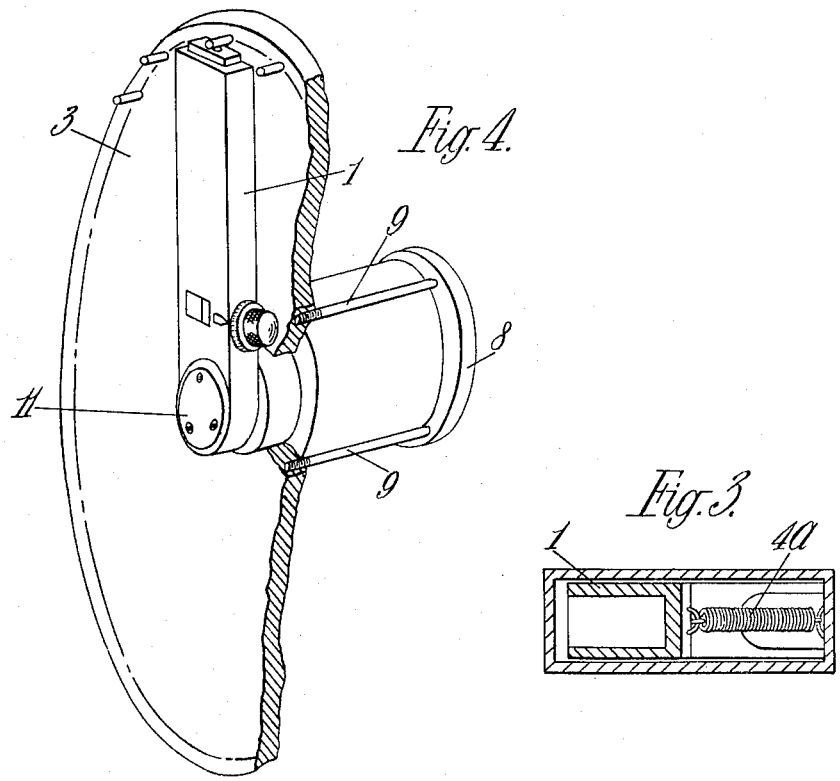
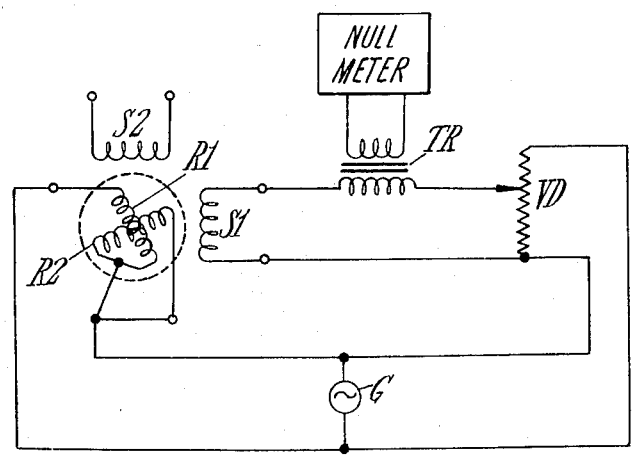
Inventor
J. Bell
By Glascock Downing Seebert
Attys.

United States Patent Office 2,726,382
Patented Dec. 6, 1955

2,726,382
ANGULAR ADJUSTMENT OF SYNCHROS

John Bell, Beckenham, England, assignor to Muirhead & Company Limited, Beckenham, England Application February 11, 1952, Serial No. 270,981

Claims priority, application Great Britain February 26, 1951

9 Claims. (Cl. 340—315)

This invention relates to testing apparatus for testing the accuracy of synchros and the like devices, capable of high angular precision.

In such applications it is required that an attachment be made to the rotor of the device under test and that the rotor be set in sequence in a given number of known angular positions, for example 0, 10, 20, 30 etc. degrees.

The testing apparatus used for determining the accuracy of the synchro is set by appropriate switching of the test instrument comprising a network associated with an electronic indicator or other detector to examine the performance of the synchro at these known positions. Any error in the synchro is shown by an error-indicating device of the test instrument.

In the testing procedure the synchro may be mounted in a suitable dial at a set angular position, a pointer being attached to the spindle of the synchro. The pointer is set in turn to the angles at which tests are to be made and in each case the voltage delivered by the synchro is compared with a known voltage and any difference between the two voltages is detected by a null meter. If the synchro is perfect then the null meter will give a zero reading at the appropriate angular position of the pointer, but where there is an error the pointer is moved slightly until the null reading is obtained. The angle through which the pointer has been moved from the nominal position is then the angular error of the synchro at that nominal angular position. The dial is usually graduated in degrees and the pointer may carry a vernier scale so that, for example, the angular error may be read correctly to within one tenth of a degree.

An object of the present invention is to render this more simple and to avoid operating fatigue.

The invention consists of an arrangement for testing synchros or similar devices comprising a two-part radius arm or the like, one part for securing to the rotor of the device to be tested, and the other part for securing at a number of fixed angular positions and a micrometer screw or the like for circumferential relative displacement of the two parts.

The invention will be described with reference to the accompanying drawings.

Figure 3 is a section on the line 3—3 of Figure 2.

Figure 4 is a cut-away perspective view of the general arrangement in use.

Figure 5 is a diagram of a test circuit used in association with the device of the present invention.

Figures 1, 2:
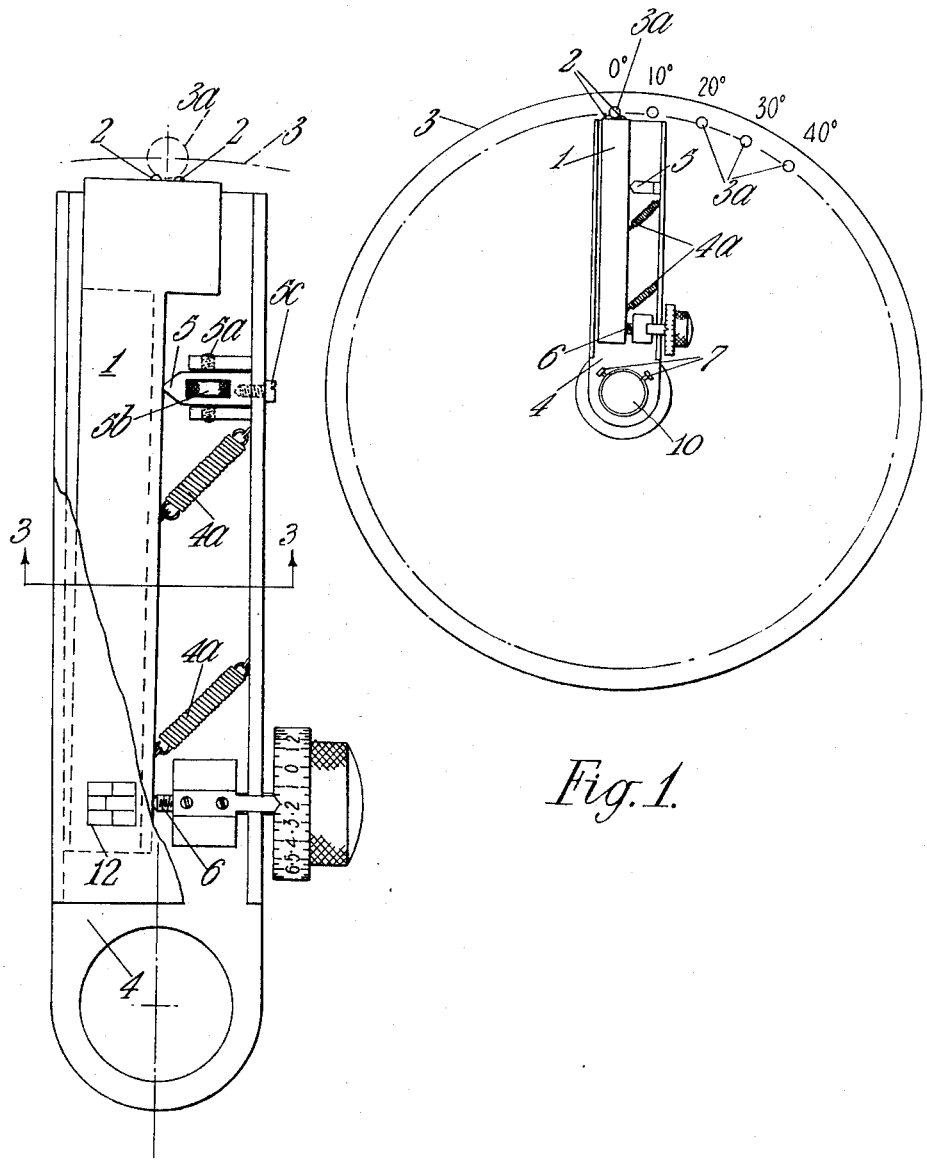
Figure 1 is a view showing the pointer in use.
Figure 2 is an enlarged view of part of Figure 1 showing also a modification.

The drawings show a composite pointer or radius arm, one portion 1 of which is spring-urged to enable it to slide radially outwards with respect to the main body of the pointer. The portion 1 of the pointer is a radially disposed rectangular block which carries at its outer end a V notch, or two cylinders or balls 2 constituting virtually a V notch, which registers on a selection of pegs or the like 3a disposed circularly around a disc or plate 3, the synchro itself being mounted concentrically with the circle of pegs.

The portion 1 of the pointer is held in the portion 4 of the pointer by means of two springs 4a therebetween. With the springs inclined as indicated the portion 1 of the pointer is spring-urged radially outwards and is also controlled by pressure against its surface by an abutment 5 fixed to the portion 4 of the pointer and by the micrometer screw 6 radially spaced inwards from the abutment. The springs 4a are located between the abutment and the micrometer screw. The micrometer screw is mounted substantially at right angles to the radius of the pointer, and by moving it a relative adjustment is made between the angular position of the portion 1 of the pointer, and the portion 4 of the pointer, since the portion 1 of the pointer hinges about its point of contact with the fixed abutment acting as a fulcrum and moves radially outwards to maintain contact with the peg 3a, or is forced radially inwards thereby. Thus the position of the rotor of the synchro under test is readily set to any desired position by fitting the end of the portion 1 of the pointer on to the appropriate peg 3a and the minor adjustment of the angle of the rotor is readily set and easily read by an appropriate scale on the micrometer screw which can be suitably calibrated.

The micrometer screw may also have mounted upon it a scale which is held by friction only and can be readily set to any desired angular position with relation to the screw.

In use, the synchro is mounted on the disc or plate 3 by means of the clamping ring 8 and bolts 9, and the rotor 10 of this synchro set at zero by reference to a test instrument which indicates a zero or balance of the voltage, and secured to the inner end of the portion 4 of the pointer by means of screws 7 (Figure 1) or a clamping plate 11 (Figure 4). The scale of the micrometer screw is set at zero. The synchro rotor is then turned to the appropriate positions, 10 degrees, 20 degrees, etc. in sequence. The testing instrument is read to give balance which is adjusted by operation of the micrometer screw, the errors of angle at each position being read by the departure from zero on the scale of the micrometer screw.

Referring to Figure 2 of the drawings, it will be seen that the centre line of the locating peg, the fulcrum of the spring-urged portion of the pointer and the end of the micrometer screw are not in line. A refinement in construction is obtained by making the parts in such a way that these three points are in line. Operation of the micrometer screw adjustment in this case causes a minimum of radial movement of the spring-urged portion of the pointer and consequently reduces the minor errors due to friction at the fulcrum.

In the accompanying drawings the abutment 5 forming the fulcrum is made adjustable to provide a means of adjusting the vernier scale precisely to a required value by altering to a small extent the lever ratio of the moving part of the pointer. Thus a threaded spindle 5a passes through the abutment 5 and a milled nut 5b is located in a slot in the abutment and is in threaded engagement with the spindle 5a. By turning the nut 5b the abutment is moved radially in or out and can then be locked by means of the screw 5c. Also a registration 12 is provided on the pointer for setting up approximately the zero position of the moving portion in the initial set up of the pointer. A line is provided on both the fixed and moving portions of the pointer and when these lines are coincident the vernier screw is approximately midway in its travel.

Various other modifications may be made within the scope of the invention.

As an example of a test of a synchro employing the testing apparatus according to the invention, Figure 5 shows the circuit for testing a type of synchro known as a "resolver." This has two separate stator windings S1 and S2, positioned at right angles to each other and two rotor windings R1 and R2 also mutually at right angles. The dotted circle in the figure indicates the rotor. Three connections are brought out from the rotor by means of slip rings and brushes, being respectively one end of winding R1, one end of winding R2 and a common connection to the remaining ends of the two windings.

For the purpose of the test one rotor winding (winding R2 in the figure) is short-circuited and the other is connected to a single-phase alternating current supply G. One stator winding (S2 in the figure) is left unconnected. One end of winding S1 is connected through the primary winding of an instrument transformer TR to the sliding contact of a voltage divider VD and the other is connected to one end of VD. The outer ends of VD are also connected to supply G. The null meter may be one of several types well known in the electronic art and need not be further described here since its only function is to give a clear indication when there is no voltage in the secondary of transformer TR.

The voltage induced in winding S1 depends upon the angular position of rotor winding R1. The synchro is mounted in the dial of the test apparatus as previously described and the pointer is attached in its correct angular position to the spindle. The pointer is then set to an angle on the dial at which it is described to make a test. The moving contact of potential divider VD is set to provide the exact voltage which should exist in S1. The two voltages act in opposition and if they are exactly balanced then the null meter will indicate no voltage. In practice there is nearly always a slight error and the micrometer screw 6 is turned in the appropriate direction to reduce the reading of the null meter to zero. The scale of screw 6 then indicates the angle through which the synchro spindle has been turned and this is the angular error of the synchro at the nominal angle at which the test has been carried out.

I claim:

1. An arrangement for effecting accurate angular adjustment of synchros and like devices for testing purposes, comprising a plate to which the device is adapted to be secured and a radius arm comprising one part for securing to the rotor of the device and to which is fixed in radially spaced relation an abutment and a micrometer screw, a second part for securing at a number of fixed angular positions on the plate, and spring means for urging the second part radially outwards and against said abutment and micrometer screw.

2. An arrangement for effecting accurate angular adjustment of synchros and like devices for testing purposes, comprising a two-part radius arm, means for securing one part at its inner end to the rotor of the device to be tested, means for pivotally securing the other part adjacent its outer end at a number of fixed angular positions, a pivotal connection between the two parts and a micrometer screw for effecting circumferential relative displacement of the two parts to adjust the angle of the rotor.

3. An arrangement as claimed in claim 2, in which the pivotal connection is formed by an abutment on one of the parts and springs urging the two parts together circumferentially and apart radially.

4. An arrangement as claimed in claim 2, in which said other part is adapted to be pivotally secured at its outer end to a selection of pegs disposed circularly around a disc.

5. An arrangement as claimed in claim 2, in which a registration is provided comprising a line on each part of the radius arm located so that when these lines are coincident the micrometer screw is approximately midway in its travel.

6. An arrangement as claimed in claim 3, in which the abutment is adjustable in the direction of the length of the radius arm.

7. An arrangement as claimed in claim 3, in which the springs are located between the abutment and the micrometer screw.

8. An arrangement as claimed in claim 4, in which the said other part registers on the pegs by means of a V-notch.

9. An arrangement as claimed in claim 4, in which the locating peg, the pivotal connection and the end of the micrometer screw are arranged to be in line.

References Cited in the file of this patent

UNITED STATES PATENTS

| | | |
|---|---|---|
| 1,554,915 | Hewlett et al. | Sept. 22, 1925 |
| 1,791,648 | Tate | Feb. 10, 1931 |
| 2,112,252 | Sang | Mar. 29, 1938 |
| 2,357,643 | Floyd | Sept. 5, 1944 |
| 2,467,899 | Lowkrantz | Apr. 19, 1949 |
| 2,497,069 | Carpenter et al. | Feb. 14, 1950 |
| 2,539,713 | Wilkenson et al. | Jan. 30, 1951 |
| 2,609,435 | Gerth | Sept. 2, 1952 |
| 2,625,599 | Downes | Jan. 13, 1953 |